Sept. 8, 1959

C. F. STAPLES 2,902,890

BORING MACHINES

Filed Nov. 27, 1953

INVENTOR.
CHARLES F. STAPLES

BY Hauk + Hardesty

ATTORNEYS

Sept. 8, 1959   C. F. STAPLES   2,902,890
BORING MACHINES

Filed Nov. 27, 1953   3 Sheets-Sheet 2

INVENTOR.
CHARLES F. STAPLES
BY
*Hanke & Hardesty*
ATTORNEYS

Sept. 8, 1959 C. F. STAPLES 2,902,890
BORING MACHINES
Filed Nov. 27, 1953 3 Sheets-Sheet 3
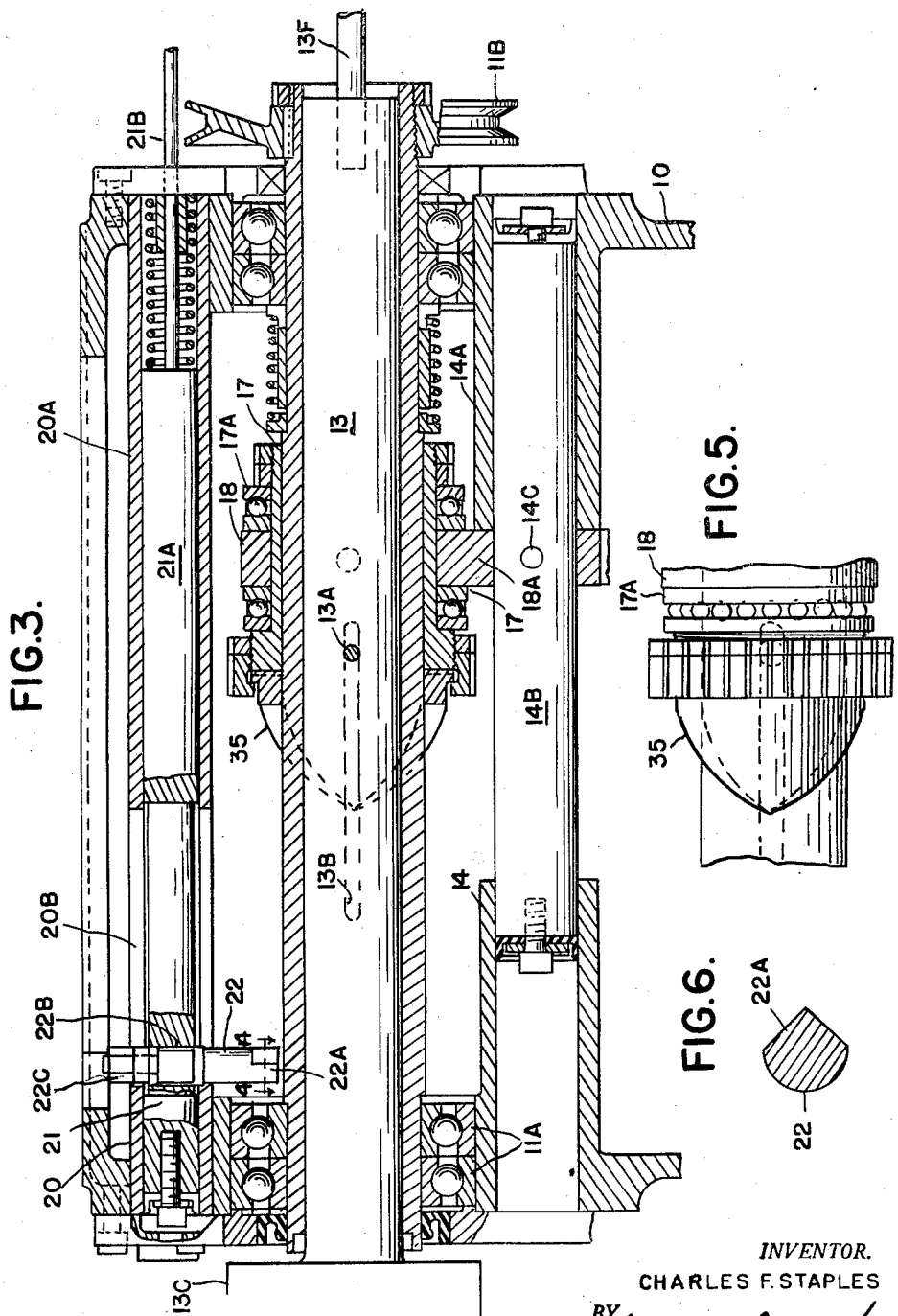
INVENTOR.
CHARLES F. STAPLES
BY
Hardle & Hardisty
ATTORNEYS

2,902,890

BORING MACHINES

Charles F. Staples, Birmingham, Mich.

Application November 27, 1953, Serial No. 394,759

1 Claim. (Cl. 77—3)

The present invention relates to machine tools and specifically to boring machines, and this among its objects to provide means for feeding the boring tool into the work and then for orienting the tool prior to withdrawal so that any scoring produced by retracting the tool is at a predetermined location in the bore.

Other objects will readily occur to those skilled in the art upon reference to the following description and the accompanying drawings in which Fig. 1 is a longitudinal sectional view taken on line 1—1 of Fig. 2.

Fig. 3 is a sectional view on line 3—3 of Fig. 2 showing the control cylinder.

Fig. 5 is a view in elevation of the orientation cam.

Fig. 6 is a section of the cam follower on line 4—4 of Fig. 3.

Figure 1:
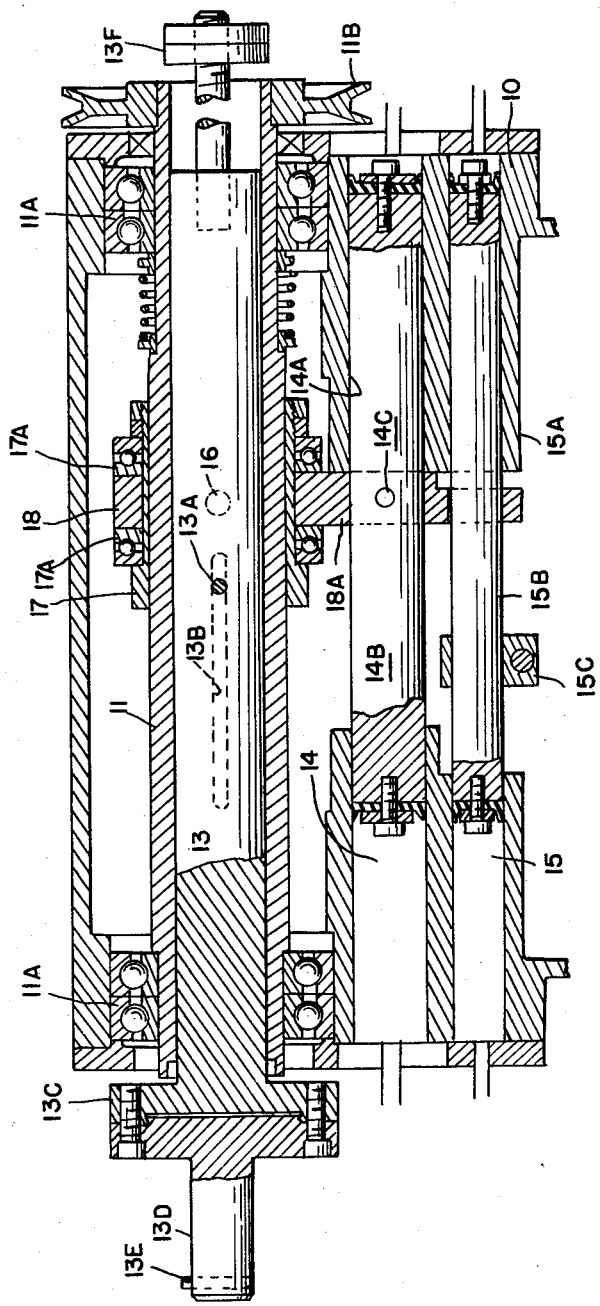

In the drawings, a frame 10 is shown as having mounted therein a quill or tube 11 supported in suitable bearings 11A. The tube 11 is driven by a suitable motor 12 through pulley 11B and has slidably fitted in it the shaft 13 in turn driven by the quill 11 by means of a pin 13A fixed in the quill and passing through a slot 13B in the shaft 13. The shaft carries at its forward end a flange 13C upon which may be mounted a boring bar 13D, the bit being shown at 13E. At the other end is a suitable adjustable stop 13F.

Also mounted in the frame is a pair of axially aligned opposed cylinders 14 and 14A coacting with a double end piston 14B and a second pair of axially aligned opposed cylinders 15 and 15A coacting with a double end piston 15B. The axes of the two pairs of cylinders are parallel to the axis of the quill and conveniently in the same plane.

Fixed upon the quill 11 by means of pins, one of which is indicated at 16, is a sleeve 17 upon which is mounted a pair of thrust bearings 17A and between them a plate 18 rotatable relative to the sleeve. This plate 18 has a lateral extension 18A through which extends the piston 14B, the piston being fixed against relative movement by means of a suitable pin 14C. The extension 18A is of sufficient length also to provide for the passage through it of the piston 15B which, however, is not fixed therein. The piston 15B however carries an adjustable fixed collar 15C, the purpose of which will be explained later.

Also mounted in the frame 10 is a cylinder 20 in which acts a piston 21. The active portion of the cylinder, it will be noticed, is relatively short but the cylindrical member 20A extends to the opposite end of the frame and serves as a guide for piston extension 21A. Intermediate the two cylinder portions 20—20A the member is slotted as at 20B to allow the reciprocation of the cam follower carrier 22, shown as a stud projecting downwardly with the cam follower 22A at its lower end. The stud is mounted in a suitable socket 22B in the piston extension and is fixed in place by the nuts 22C.

At the end of piston extension 21A is fixed an axially located rod 21B, extending beyond the end of cylinder extension 20A and serving to control the electric circuit as will be explained later.

The cam follower 22A is adapted to coact with a cam 35 fixed to the sleeve 17 on quill 11, as shown best in Figs. 3 and 5, to orient the sleeve and quill at the end of a boring operation.

Figure 4:
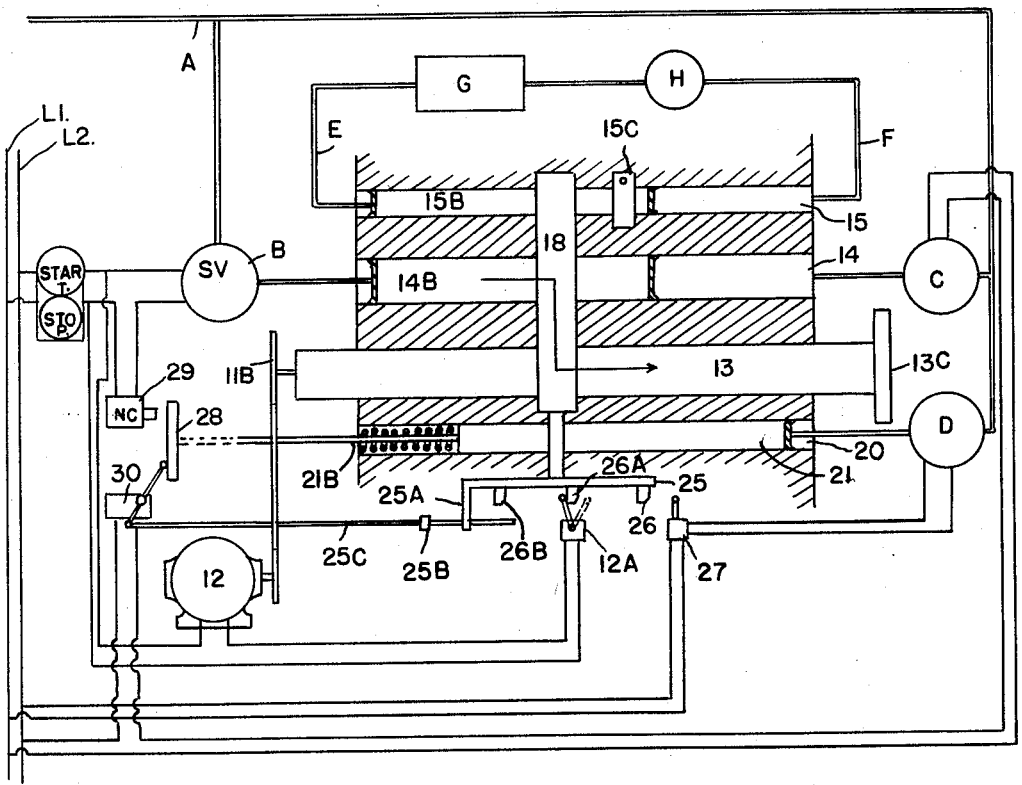
Fig. 4 is a diagrammatic view of the machine showing the electric and pressure fluid controls.
Figure 2:
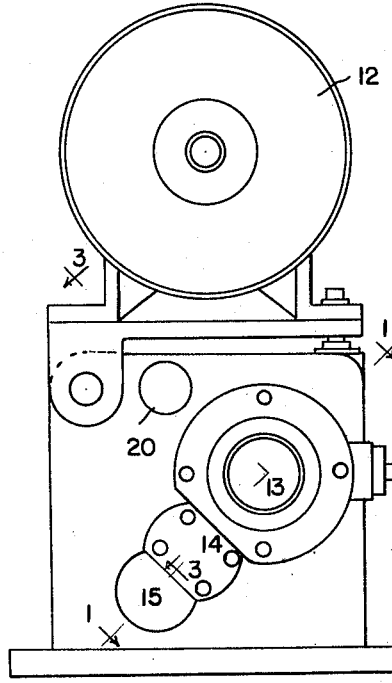
Fig. 2 is an end view of the machine.

Referring now to Fig. 4 which shows the fluid connections and indicates the operation of the tool, from a suitable source of compressed air a supply line A and branches lead to solenoid valves B, C and D, the valves B and C being at opposite ends of cylinders 14 and the valve D at the active end of cylinder 20.

Connected to the two opposite ends of cylinders 15 are oil lines E and F, the line E leading from a regulatable flow control valve G and the line F connected to a reservoir H delivering oil through valve G to the line E.

The several solenoid valves and the motor are operated and controlled electrically as indicated in Fig. 4.

The "start" button completes the circuit through motor 12 through the normally closed switch 12A and, at the same time, opens the solenoid valve B, permitting the entrance of air to cylinders 14 to move piston 14B toward the right. The shaft 13 being rotated by the motor is also moved through the action of plate 18. This movement is quite rapid until the plate 18 strikes the collar 15C carried by piston 15B, this being so located that the boring tool is just about to contact the work.

When the collar 15C is contacted, the piston 15B begins also to move but since the cylinders 15 are filled with oil, its movement is controlled by the rate of inflow of oil through valve G. The range of movement of the shaft 13 is controlled by means of an arm attached to plate 18 and carrying a horizontal bar 25 upon which are adjustably fixed trips or triggers 26 and 26A so spaced that trip 26A actuates switch 12A to open its circuit as the boring movement of shaft 13 is completed. The valve B still being open, the piston 14B will continue its movement a short distance until the plate 18 is stopped by the end of cylinder 14. In this additional movement, the boring tool having ceased rotation, the cam 35 contacts the cam follower 22A and rotates the shaft 13 forward or backward, according which face of the cam strikes the follower, until the follower reaches the base of the cam, which is of such shape that the shaft 13 is then in the desired oriented position. However, in such additional movement, the trip 26 closes and holds closed the electric circuit through a switch 27 and thereby operates the solenoid to open valve D.

When the valve D is opened, the piston 21 is moved toward the left (Fig. 4) and eventually the rod 21B carrying the plate 28 actuates switches 29 and 30. The switch 30, normally closed, is opened and the switch 29, normally open, is closed. The opening of switch 29 breaks the circuit through valve B allowing it to close, and the switch 30 completes the circuit to open valve C. The pistons 14B and 15B therefore begin to move back and withdraw the boring tool. This releases the switch 27 and therefore closes valve D and thus permits the return of piston 21 by the spring 121. The return motion of piston 21 and plate 28 allows switch 30 to remain closed until the plate 18 is returned to nearly its idle position, but just before reaching such position an ear 25A depending from the bar 25 strikes the collar 25B carried on a rod 25C connected to the lever of switch 30 and moves the latter to "off" position, thereby breaking the circuit to valve C to close the latter. As soon as switch 30 is opened, the machine parts all become idle.

I claim:

In a boring machine, a longitudinally movable shaft, a boring tool carried thereby, a rotatable quill surrounding said shaft and including driving means therefor, a fluid pressure actuated piston member in fixed relation to said shaft for moving the latter longitudinally, a second piston hydraulically controlled for regulating the movement of the first piston, a third piston actuated pneumatically, and means carried by said third piston and by said quill for orienting the latter at the end of a boring operation.

References Cited in the file of this patent

UNITED STATES PATENTS

| | | |
|---|---|---|
| 1,465,591 | Seavey | Aug. 21, 1923 |
| 2,146,446 | Schmidt et al. | Feb. 7, 1939 |
| 2,174,044 | Schmidt et al. | Sept. 26, 1939 |
| 2,222,307 | Blood | Nov. 19, 1940 |
| 2,237,692 | Stewart | Apr. 8, 1941 |
| 2,374,764 | Mathys | May 1, 1945 |
| 2,640,254 | Bowen | June 2, 1953 |
| 2,657,595 | Shaff | Nov. 3, 1953 |